US008924116B2

(12) United States Patent
Yamada et al.

(10) Patent No.: US 8,924,116 B2
(45) Date of Patent: Dec. 30, 2014

(54) MOTION CONTROL APPARATUS FOR VEHICLE

(75) Inventors: Tetsuya Yamada, Kiyosu (JP); Hideaki Koto, Anjyo (JP)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 170 days.

(21) Appl. No.: 13/361,384

(22) Filed: Jan. 30, 2012

(65) Prior Publication Data
US 2012/0283923 A1 Nov. 8, 2012

(30) Foreign Application Priority Data

Jan. 31, 2011 (JP) ................................. 2011-018049

(51) Int. Cl.
*B60T 8/1755* (2006.01)
*B60T 8/24* (2006.01)

(52) U.S. Cl.
CPC ............. *B60T 8/17554* (2013.01); *B60T 8/243* (2013.01)
USPC ........ 701/70; 701/1; 701/38; 701/45; 701/72; 701/93; 340/435; 340/438; 340/440

(58) Field of Classification Search
CPC ......... B60T 1/00; B60T 7/00; B60T 2201/00; B60T 2200/00; B60W 10/00; B60W 2030/00; B60W 2300/00; B60W 2400/00; G60G 1/00; B60G 2202/00
USPC .......... 701/1, 38, 45, 70, 72, 83, 93; 340/435, 340/438, 440
See application file for complete search history.

(56) References Cited

U.S. PATENT DOCUMENTS

| 6,086,168 | A | 7/2000 | Rump | |
|---|---|---|---|---|
| 6,799,092 | B2 * | 9/2004 | Lu et al. | ............................ 701/1 |
| 6,954,140 | B2 * | 10/2005 | Holler | ........................... 340/438 |
| 7,057,503 | B2 * | 6/2006 | Watson | ......................... 340/440 |
| 7,063,334 | B2 * | 6/2006 | Lim | ............................ 280/5.506 |
| 7,118,184 | B2 * | 10/2006 | Harada et al. | ................. 303/146 |
| 7,316,457 | B2 * | 1/2008 | Taniguchi et al. | ............ 303/147 |
| 7,353,098 | B2 * | 4/2008 | Sakata | ............................ 701/38 |
| 7,463,965 | B2 * | 12/2008 | Sakata | ............................ 701/83 |
| 7,513,577 | B2 * | 4/2009 | Taniguchi et al. | ............ 303/146 |
| 7,571,043 | B2 * | 8/2009 | Sakata | ............................ 701/72 |
| 7,630,816 | B2 * | 12/2009 | Yasutake et al. | ................ 701/72 |

(Continued)

FOREIGN PATENT DOCUMENTS

JP           3480930 B2    12/2003

*Primary Examiner* — John R Olszewski
*Assistant Examiner* — Truc M Do
(74) *Attorney, Agent, or Firm* — Buchanan Ingersoll & Rooney PC

(57) ABSTRACT

A vehicle motion control device providing good trace performance with a simple configuration for performing a rollover prevention control involving suppressing rollover of a vehicle by applying a braking force to a front wheel located on the radially outer of the turning locus and a rear wheel located on the radially outer of the turning locus, comprises a braking control unit configured to restrict the application of the braking force to the front wheel located on the radially outer of the turning locus until a predetermined limit time elapses since the application of the braking force to the rear wheel located on the radially outer of the turning locus is started when the braking force is applied to the front wheel located on the radially outer of the turning locus and the rear wheel located on the radially outer of the turning locus as the rollover prevention control.

5 Claims, 8 Drawing Sheets

(56) References Cited

U.S. PATENT DOCUMENTS

| | | | |
|---|---|---|---|
| 7,731,305 B2* | 6/2010 | Harrison et al. | 303/167 |
| 7,878,605 B2* | 2/2011 | Kokubo et al. | 303/151 |
| 8,554,414 B2* | 10/2013 | Koto et al. | 701/41 |
| 2002/0109310 A1* | 8/2002 | Lim | 280/5.508 |
| 2002/0139599 A1* | 10/2002 | Lu et al. | 180/282 |
| 2005/0099065 A1* | 5/2005 | Harada et al. | 303/146 |
| 2005/0110345 A1* | 5/2005 | Sakata | 303/146 |
| 2005/0216163 A1* | 9/2005 | Sakata | 701/70 |
| 2005/0222729 A1* | 10/2005 | Sakata | 701/38 |
| 2006/0055237 A1* | 3/2006 | Taniguchi et al. | 303/146 |
| 2006/0071551 A1* | 4/2006 | Taniguchi et al. | 303/146 |
| 2006/0076741 A1* | 4/2006 | Lim | 280/5.508 |
| 2007/0018499 A1* | 1/2007 | Kokubo et al. | 303/151 |
| 2007/0112498 A1* | 5/2007 | Yasutake et al. | 701/72 |
| 2007/0236080 A1* | 10/2007 | Harrison et al. | 303/11 |
| 2012/0065859 A1* | 3/2012 | Koto et al. | 701/70 |
| 2012/0283923 A1* | 11/2012 | Yamada et al. | 701/70 |

* cited by examiner

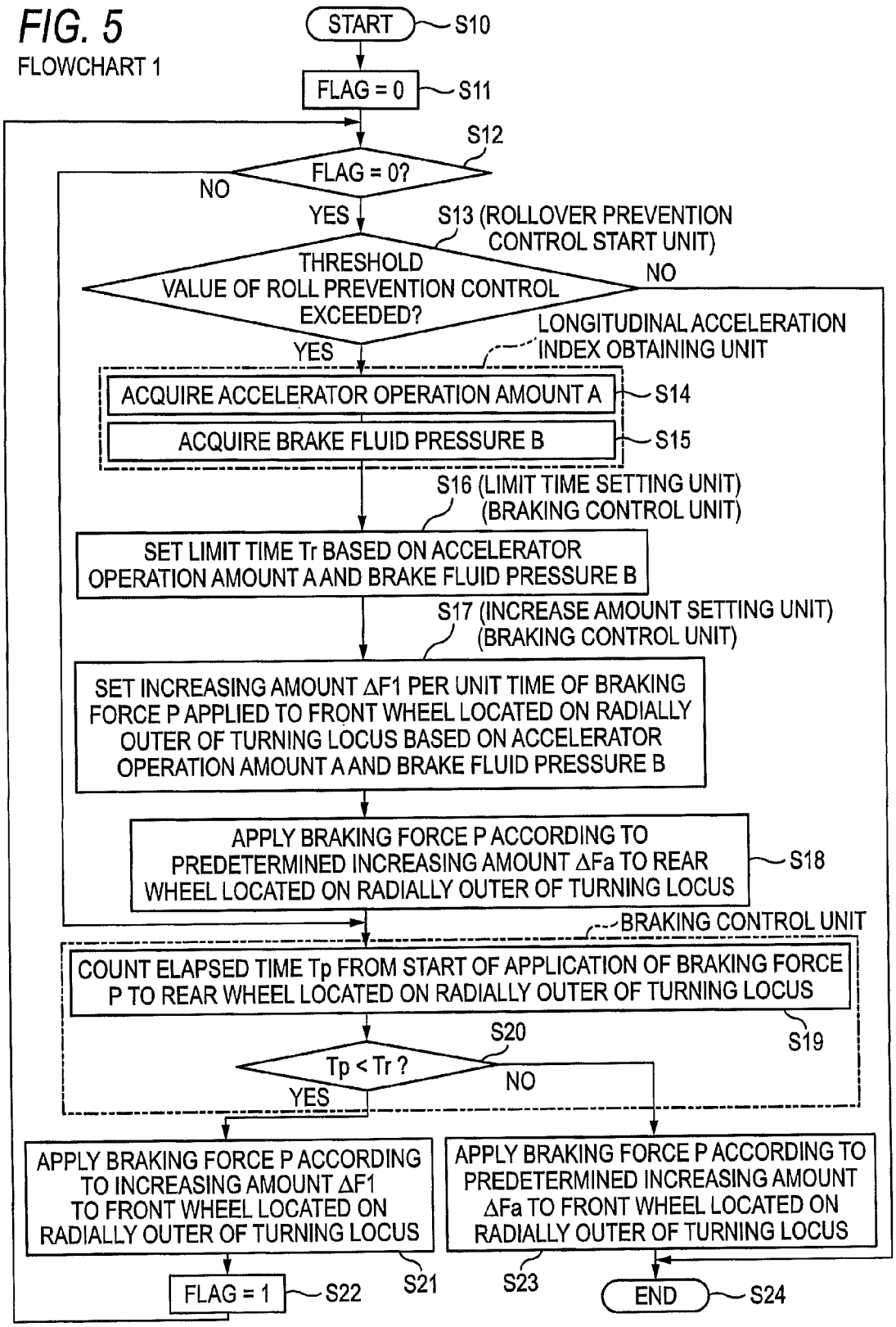
FIG. 5 FLOWCHART 1

FLOWCHART 2

FLOWCHART 3

MOTION CONTROL APPARATUS FOR VEHICLE

BACKGROUND

The present invention relates to a motion control device for a vehicle which controls the motion of a turning vehicle by controlling the braking forces applied to the wheels of the vehicle.

Up to now, it has been requested to control the motion of a vehicle so that a rollover of the vehicle does not occur by an excessive rolling that occurs in the vehicle when the vehicle is in a turning state. In general, the magnitude of this roll depends on the magnitude of an actual lateral acceleration (that is, centrifugal force acting on the vehicle) that is a left/right directional component of the vehicle of an acceleration acting on the vehicle, and is increased according to the increase of the actual lateral acceleration.

For example, Japanese Patent No. 3480930 discloses a braking device for a vehicle, in which a rollover prevention threshold value is set as an index such as the actual lateral acceleration that indicates a tendency of rollover, and a braking force is applied to outer wheels (front and rear wheels) in a turning direction of the vehicle when (an absolute value of) the actual lateral acceleration becomes equal to or larger than a threshold value. According to this braking device, as the braking force is applied to the outer wheels (front and rear wheels) in the turning direction, the outer wheels become in a lateral slip state and movement in an outward direction (direction of the centrifugal force) that is orthogonal to the turning direction occurs in the vehicle, resulting in that a force to roll the vehicle is reduced to prevent the rollover.

SUMMARY

However, according to the technology disclosed in Japanese Patent No. 3480930, since the rollover of the vehicle body is prevented through the occurrence of the lateral slip in the centrifugal force direction on the outer wheels in the turning direction, the wheels travel along a line that is not intended by a driver to deteriorate the trace. Accordingly, there is a fear that an unfavorable feeling may be given to the driver.

Accordingly, the present invention has been made in consideration of the above-described situations, and the subject to be solved by the invention is to provide a motion control device for a vehicle, which can obtain a good trace performance with a simple configuration.

To solve the problem, a motion control device according to claim 1 for a vehicle that performs rollover prevention control for suppressing a rollover of the vehicle by applying a braking force to a front wheel located on the radially outer of the turning locus and a rear wheel located on the radially outer of the turning locus, comprises a braking control unit for restricting the application of the braking force to the front wheel located on the radially outer of the turning locus until a predetermined limit time elapses since the application of the braking force to the rear wheel located on the radially outer of the turning locus is started when the braking force is applied to the front wheel located on the radially outer of the turning locus and the rear wheel located on the radially outer of the turning locus as the rollover prevention control.

An aspect of the present invention provides the following arrangements:

First Aspect

A motion control device for a vehicle that performs rollover prevention control for suppressing a rollover of the vehicle through application of a braking force to a front wheel located on the radially outer of the turning locus and a rear wheel located on the radially outer of the turning locus of the vehicle, comprising:

a braking control unit for restricting the application of the braking force to the front wheel located on the radially outer of the turning locus until a predetermined limit time elapses since the application of the braking force to the rear wheel located on the radially outer of the turning locus is started when the braking force is applied to the front wheel located on the radially outer of the turning locus and the rear wheel located on the radially outer of the turning locus as the rollover prevention control.

Second Aspect

The motion control device of the first aspect, wherein the braking control unit makes an increasing amount per unit time of the braking force that is applied to the front wheel located on the radially outer of the turning locus be smaller than an increasing amount per unit time of the braking force that is applied to the rear wheel located on the radially outer of the turning locus as the restriction of the braking force applied to the front wheel located on the radially outer of the turning locus.

Third Aspect

The motion control device of the second aspect, wherein the braking control unit sets the increasing amount per unit time of the braking force applied to the front wheel located on the radially outer of the turning locus to zero as the restriction of the braking force applied to the front wheel located on the radially outer of the turning locus.

Fourth Aspect

The motion control device of the second aspect, further comprising:

a longitudinal acceleration index obtaining unit for obtaining longitudinal acceleration indexes correlated to longitudinal acceleration of the vehicle; and an increase amount setting unit for setting the increasing amount per unit time of the braking force that is applied to the front wheel located on the radially outer of the turning locus on the basis of the longitudinal acceleration indexes that are obtained by the longitudinal acceleration index obtaining unit.

Fifth Aspect

The motion control device of the first aspect, further comprising:

a longitudinal acceleration index obtaining unit for obtaining longitudinal acceleration indexes correlated to longitudinal acceleration of the vehicle; and a limit time setting unit for setting the limit time on the basis of the longitudinal acceleration indexes that are obtained by the longitudinal acceleration index obtaining unit.

According to a first aspect of the present invention, during the turning of the vehicle, application of the braking force to the front wheel located on the radially outer of the turning locus is restricted until a predetermined limit time elapses since the application of the braking force to the rear wheel located on the radially outer of the turning locus is started. That is, during the turning of the vehicle, the braking force is first applied to the rear wheel located on the radially outer of the turning locus that does not directly decrease a yaw moment of the vehicle rather than the front wheel located on the radially outer of the turning locus. Accordingly, since the velocity of the vehicle is reduced speed without greatly changing the traveling line and the centrifugal force that acts on the vehicle is reduced, the rollover of the vehicle can be suppressed without deteriorating the tracing performance.

Further, by the application of the braking force to the rear wheel located on the radially outer of the turning locus, the vehicle is falling forward, and the vehicular load is transferred to the front wheel located on the radially outer of the turning locus that is liable to vehicular load missing. Accordingly, after the predetermined limit time elapses since the application of the braking force to the rear wheel located on the radially outer of the turning locus is started, namely after the vehicular load is sufficiently applied to the front wheel located on the radially outer of the turning locus, the braking force is applied to the front wheel located on the radially outer of the turning locus. When the braking force is applied to the front wheel located on the radially outer of the turning locus, the frictional circle of the front wheel located on the radially outer of the turning locus becomes larger by the movement of the vehicular load to the front wheel located on the radially outer of the turning locus. Thus, the decrease of the lateral force due to the application of the braking force can be suppressed. Through this, the centrifugal force can be sufficiently reduced by large braking of the front and rear wheels without greatly changing the traveling line of the vehicle, and thus the rollover of the vehicle can be suppressed with a good trace performance maintained.

According to a second aspect of the present invention, the braking control unit according to the first aspect of the preset invention controls the increasing amount per unit time of the braking force that is applied to the front wheel located on the radially outer of the turning locus to be smaller than the increasing amount per unit time of the braking force that is applied to the rear wheel located on the radially outer of the turning locus. Since the braking force is applied to the front and rear wheels located on the radially outer of the turning locus depending on the magnitude of the vehicular load that is received by the rear wheel located on the radially outer of the turning locus having a large vehicular load and the front wheel located on the radially outer of the turning locus having a small vehicular load during the acceleration in turning state, the occurrence of an excessive lateral slip, which is caused by a loss of the gripping force of the front wheel located on the radially outer of the turning locus, is prevented, and thus the tracing performance of the vehicle is not deteriorated.

According to a third aspect of the present invention, the braking control unit according to the second aspect of the present invention sets the increasing amount per unit time of the braking force applied to the front wheel located on the radially outer of the turning locus to zero. Accordingly, the braking force is not applied to the front wheel located on the radially outer of the turning locus before the movement of the vehicular load to the front wheel located on the radially outer of the turning locus is sufficiently carried out, but is applied only to the rear wheel located on the radially outer of the turning locus, and thus the movement of the vehicular load to the front wheel located on the radially outer of the turning locus is carried out more reliably. Further, the braking force is applied to the front wheel located on the radially outer of the turning locus after the movement of the vehicular load to the front wheel located on the radially outer of the turning locus is sufficiently carried out. Through this, the excessive lateral slip is suppressed by sufficient grip of the front wheel located on the radially outer of the turning locus for the road surface, and thus front wheel located on the radially outer of the turning locus gets a good tracing performance. At the same time, the rollover is suppressed by reducing the centrifugal force of the vehicle through sufficient reduction of the vehicle speed along with the rear wheel located on the radially outer of the turning locus.

According to a fourth aspect of the present invention, the longitudinal acceleration index obtaining unit according to the second aspect of the present invention obtains the longitudinal acceleration indexes of the vehicle. Then, the longitudinal acceleration index obtaining unit sets the increasing amount per unit time of the braking force that the increase amount setting unit applies to the front wheel located on the radially outer of the turning locus on the basis of the obtained longitudinal acceleration indexes. As described above, the longitudinal acceleration indexes of the vehicle are obtained in real time, a load balance between the rear wheel located on the radially outer of the turning locus and the front wheel located on the radially outer of the turning locus of the vehicle is estimated on the basis of the obtained longitudinal acceleration indexes, and the increasing amount per unit time of the braking force for the front wheel located on the radially outer of the turning locus is set according to the load balance. Through this, an appropriate braking force can be applied to the front wheel located on the radially outer of the turning locus according to the traveling state of the vehicle.

According to a fifth aspect of the present invention, the longitudinal acceleration index obtaining unit according to any one of the first to fourth aspects of the present invention obtain the longitudinal acceleration indexes of the vehicle. Further, the limit time setting unit sets a limit time for restricting the braking force that is applied to the front wheel located on the radially outer of the turning locus on the basis of the obtained longitudinal acceleration indexes. As described above, the longitudinal acceleration indexes of the vehicle are obtained in real time, the load balance between the rear wheel located on the radially outer of the turning locus and the front wheel located on the radially outer of the turning locus of the vehicle is estimated on the basis of the obtained longitudinal acceleration indexes, and the limit time for restricting the braking force that is applied to the front wheel located on the radially outer of the turning locus is set according to the load balance. Through this, the braking force can be applied to the front wheel located on the radially outer of the turning locus after an appropriate limit time according to the traveling state of the vehicle.

BRIEF DESCRIPTION OF DRAWINGS

FIG. 5 is a motion control flowchart 1 according to a first embodiment of the present invention.

DESCRIPTION OF EXEMPLARY EMBODIMENTS

Hereinafter, a vehicle using a motion control device according to a first embodiment of the present invention will be described with reference to the drawings. A motion control device is a device that suppresses a rollover of a vehicle through application of a braking force to a front wheel located on the radially outer of the turning locus and a rear wheel located on the radially outer of the turning locus of the vehicle. Here, the front wheel located on the radially outer of the turning locus unit one of both front wheels Wfl and Wfr of the vehicle, which is more spaced apart from the vehicle turning center than the other thereof. Further, the rear wheel located on the radially outer of the turning locus unit one of both rear wheels Wrl and Wrr of the vehicle, which is more spaced apart from the vehicle turning center than the other thereof.

Figure 1:
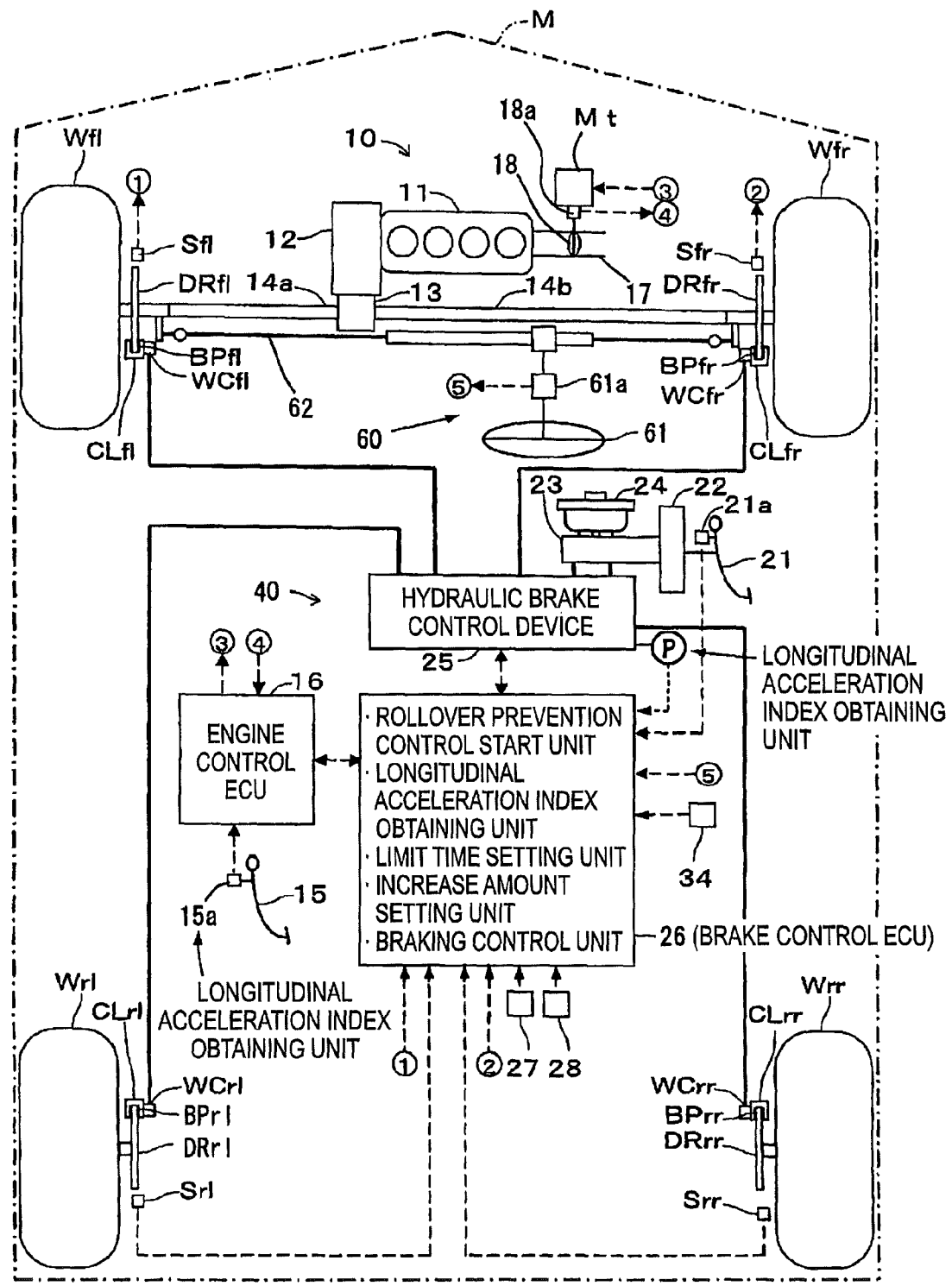
FIG. 1 is a plan view of a vehicle according to an embodiment of the present invention.

FIG. 1 is a schematic view illustrating the configuration of the vehicle. The vehicle M is a front-engine front-drive (FF) vehicle, and a driving force of an engine 11 that is a driving source mounted on a front nose portion of a vehicle body is transferred to the front wheels Wfl and Wfr. On the other hand, the vehicle M is not limited to the front-engine front-drive vehicle, but may be any other driving type vehicle, for example, a front-engine rear-drive (FR) vehicle, a four-wheel drive vehicle, or a vehicle having an electric motor as a driving source.

The vehicle M includes a driving system 10 driving the vehicle M, a steering system 60 steering the vehicle M, and a braking system 40 braking the vehicle M.

The driving system 10 includes an engine 11, a transmission 12, a differential 13, left and right driving shafts 14a and 14b, an accelerator pedal 15, and an engine control ECU 16. The driving force of the engine 11 is transmitted by the transmission 12, and is transferred to left and right front wheels Wfl and Wfr that are driving wheels through the differential 13 and the left and right driving shafts 14a and 14b. The engine 11 has an intake pipe 17 making air flow into a combustion changer of the engine 11, and a throttle valve 18 is provided in the intake pipe 17 to adjust the amount of air that passes through the intake pipe 17 through adjustment of the opening and closing rate of the intake pipe 17.

The throttle valve 18 is driven on the basis of the depression amount (operation amount) of the accelerator pedal 15 according to a driver's driving request. Specifically, the motor Mt is controlled to adjust the opening degree of the throttle valve 18 according to the operation amount of the accelerator pedal 15. Further, a fuel injection device (not illustrated) is driven on the basis of a control signal from the engine control ECU 16, and the fuel injection amount is controlled according to the depression amount (operation amount) of the accelerator pedal 15. Through this, the rotational speed of the engine 11 is controlled.

The steering system 60 includes a steering wheel 61, a steering shaft 62, and a steering angle sensor 61a. The steering wheel 61, which is provided on a driver's seat side of the vehicle M, is connected to the front wheels Wfl and Wfr that are steering wheels through the steering shaft 62 to steer the front wheels Wfl and Wfr according to the operation amount of the steering wheel 61. Further, the steering angle sensor 61a for detecting the operation amount of eh steering wheel 61 is connected to the steering wheel 61. On the other hand, since the configuration and control of the driving system 10 and the steering system 60 are not the subject of the present invention, the detailed description thereof will be omitted.

The braking system 40 includes a fluid pressure brake device braking the vehicle M through application of the fluid pressure braking force to the respective wheels Wfl, Wfr, Wrl, and Wrr. This fluid pressure brake device includes wheel cylinders WCfl, WCfr, WCrl, and WCrr regulating the rotation of the respective wheels Wfl, Wfr, Wrl, and Wrr, and a negative pressure booster 22 which is a booster device that assists (increases) a brake operation force that is generated by a depression operation of the brake pedal 21 through the application of the negative pressure of the engine 11 onto a diaphragm. Further, the fluid pressure brake device includes a master cylinder 23 generating a fluid pressure (hydraulic pressure) brake fluid (oil) that is a basic fluid pressure according to the brake operation force (that is, operation state of the brake pedal 21) boosted by the negative pressure booster 22 and supplying the brake fluid to the respective wheel cylinders WCfl, WCfr, WCrl, and Wcrr, a reservoir tank 24 storing and supplying the brake fluid to the master cylinder 23, a brake fluid pressure control device 25 provided between the master cylinder 23 and the respective wheel cylinders WCfl, WCfr, WCrl, and WCrr to form and apply control fluid pressure to the wheels to be controlled regardless of the depression state of the brake pedal 21, and a brake control ECU 26 controlling the brake fluid pressure control device 25. Further, the brake pedal 21 includes a brake switch 21a detecting the depression of the brake pedal 21.

The respective wheel cylinders WCfl, WCfr, WCrl, and WCrr are provided in respective calipers CLfl, CLfr, CLrl, and CLrr, and accommodate liquid-tightly sliding pistons (not illustrated). If the basic fluid pressure or control fluid pressure is supplied to the respective wheel cylinders WCfl, WCfr, WCrl, and WCrr, the respective pistons press a pair of brake pads BPfl, BPfr, BPrl, and BPrr that are friction members, and the brake pads sandwich disk loaders DRfl, DRfr, DRrl, and DRrr, which are rotary members that rotate integrally with the respective wheels Wfl, Wfr, Wrl, and Wrr, from their both sides to regulate the rotation. The brake pads BPfl, BPfr, BPrl, and BPrr and the disk loaders DRfl, DRfr, DWl, and DRrr constitute a friction brake.

In an embodiment of the present invention, although a disk type brake is adopted, a drum type brake may be adopted. In this case, if the basic fluid pressure or control fluid pressure is supplied to the respective wheel cylinders WCfl, WCfr, WCrl, and WCrr, the respective pistons press (expand) a pair of brake shoes, and the brake shoes are in contact with inner circumferential surfaces of brake drums that rotate integrally with the respective wheels Wfl, Wfr, Wrl, and Wrr to regulate the rotation.

Then, referring to FIG. 2, the configuration of the brake fluid pressure control device 25 will be described in detail. This brake fluid pressure control device 25 is well known, and includes fluid pressure control valves 41 and 51 that are master cylinder cut valves, booster valves 42, 43, 52, and 53 and reducer valves 45, 46, 55, and 56, which are electronic valves that constitute an ABS control valve, pressure regulating reservoirs 44 and 54, pumps 47 and 57, and a motor 33.

Figure 2:
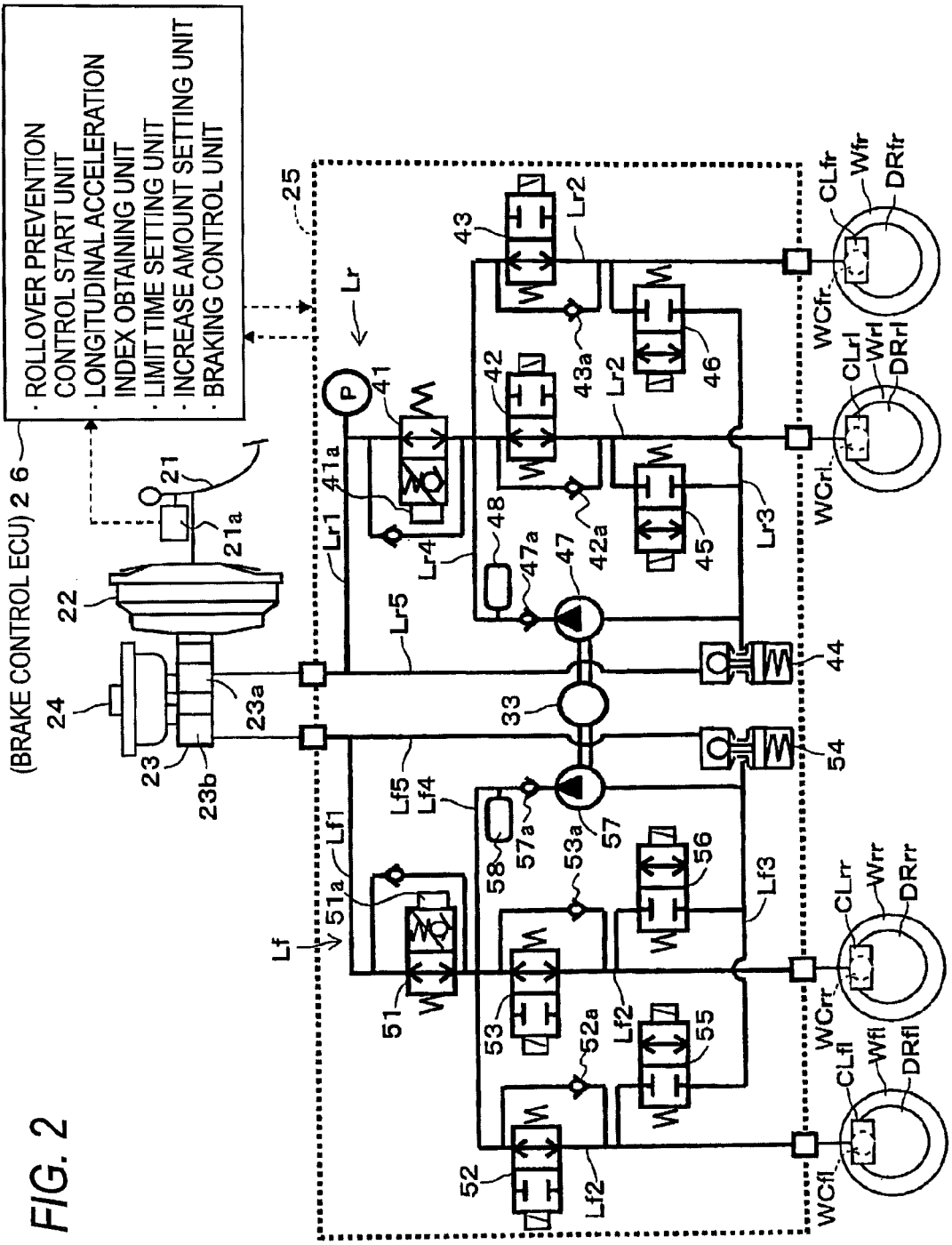
FIG. 2 is a circuit diagram of a fluid pressure brake device.

The brake piping system of the fluid pressure brake device according to an embodiment of the present invention is composed of a X type dual circuit, and the brake fluid pressure control device 25, as shown in FIG. 2, includes first and second fluid paths Lr and Lf that are connected to first and second fluid pressure chambers 23a and 23b of the master cylinder 23. The first fluid path Lr communicates with the first fluid pressure chamber 23a and the wheel cylinders WCrl and WCfr of the left rear wheel Wrl and the right front wheel Wfr. The second fluid path Lf communicates with the second fluid pressure chamber 23b and the wheel cylinders WCfl and WCrr of the left front wheel Wfl and the right rear wheel Wrr.

In the first fluid path Lr of the brake fluid pressure control device 25, the above-described fluid pressure control valve 41 that is composed of a differential pressure control valve is provided. This fluid pressure control valve 41 is controlled to be switched to a communicating state and a differential pressure state by the brake control ECU 26. The fluid pressure control valve 41 is typically in a communicating state when it is de-energized, and if the fluid pressure control valve 41 is energized to be in the differential pressure state (close state), it can maintain the pressure state of the fluid path Lr2 on the side of the wheel cylinders WCrl and WCfr to be higher than the pressure state of the fluid path Lr1 on the side of the master cylinder 23 as high as a predetermined differential control pressure. This differential control pressure is adjusted by the brake control ECU 26 according to the control current.

The fluid path Lr2 is branched in two directions. On one side of the fluid path Lr2, the booster valve 42 for controlling the pressure increase of the brake fluid pressure of the wheel cylinder WCrl in a pressurization mode of ABS control is provided, and on the other side thereof, the booster valve 43 for controlling the pressure increase of the brake fluid pressure of the wheel cylinder WCfr in the pressurization mode of ABS control is provided. The booster valves 42 and 43 are configured as two position valves of which the communicating/cutoff state can be controlled by the brake control ECU 26. The booster valves 42 and 43 are normally open solenoid valve which is de-energized to be in the communicating state and is energized to be in the cutoff state. When the booster valves 42 and 43 are controlled to be in the communicating state, the basic fluid pressure of the master cylinder 23 and/or the control fluid pressure that is formed through driving of the pump 47 and the control of the fluid pressure control valve 41 can be applied to the respective wheel cylinders WCrl and WCfr. Further, the booster valves 42 and 43 can perform the ABS control together with the reducer valves 45 and 46 and the pump 47.

On the other hand, in a normal brake state in which the ABS control is not performed, the booster valves 42 and 43 are controlled to be in a normally communicating state. Further, the booster valves 42 and 43 have safety valves 42a and 43a provided in parallel, and if the driver releases the foot from the brake pedal 21 during the ABS control, they return the brake fluid from the side of the wheel cylinders WCrl and WCfr to the reservoir tank 24.

The fluid path Lr2 between the booster valves 42 and 43 and the wheel cylinders Wcrl and WCfr communicates with the pressure regulating reservoir 44 through the fluid path Lr3. In the fluid path Lr3, the reducer valves 45 and 46, of which the communicating/cutoff state can be controlled by the brake control ECU 26, are installed. The reducer valves 45 and 46 are normally closed solenoid valve which is de-energized to be in the cutoff state and is energized to be in the communicating state. In a normal brake state (ABS non-operation state), the reducer valves 45 and 46 are in a normally cutoff state, and if the reducer valves 45 and 46 are in an appropriate communicating state through releasing of the brake fluid to the pressure regulating reservoir 44 through the fluid path Lf3, the reducer valves 45 and 46 control the brake fluid pressure in the wheel cylinders WCrl and WCfr and prevents the wheels from reaching the lock trend.

In the fluid path Lrw between the fluid pressure control valve 41 and the booster valves 42 and 43 and the fluid path Lr4 connecting the pressure regulating reservoir 44, the pump 47 is installed together with the safety valve 47a. Further, an fluid path Lr5 is provided to connect the pressure regulating reservoir 44 to the master cylinder 23 through the fluid path Lr1. The pump 47 is driven by the motor 33 according to a command from the brake control ECU 26. In the pressure reduction mode for ABS control, the pump 47 sucks the brake fluid in the wheel cylinders WCrl and WCfr or the brake fluid stored in the pressure regulating reservoir 44 and returns the brake fluid to the master cylinder 23 through the fluid pressure control valve 41 that is in a communicating state.

In the case of automatically applying the fluid pressure to any one of wheel cylinders WCfl to WCrr, such as ESC control or the like, the pump 47, in order to generate a differential control pressure in the fluid pressure control valve 41 that is switched to the differential pressure state, the pump 47 applies the control fluid pressure by discharging the brake fluid in the master cylinder 23 to the wheel cylinders WCrl and WCfr through the fluid paths Lr1 and Lr5 and the pressure regulating reservoir 44 and through the intake fluid paths Lr4 and Lr2 and the booster valves 42 and 43 that are in the communicating state. On the other hand, in order to mitigate the pulsation of the brake fluid that is discharged by the pump 47, a damper 48 is installed on the downstream side of the pump 47 of the fluid path Lr4.

In the fluid path Lr1, a pressure sensor P (constituting the longitudinal acceleration index obtaining unit according to the present invention) for detecting the master cylinder pressure that is the brake fluid pressure in the master cylinder 23 is provided, and a detection signal is transmitted to the brake control ECU 26. On the other hand, the pressure sensor P may be provided in the fluid path Lf1.

The second fluid path Lf of the brake fluid pressure control device 25, in the same manner as the first fluid path Lr, is composed of fluid paths Lf1 to Lf5. In the second fluid path Lf, a fluid pressure control valve 51 that is similar to the fluid pressure control valve 41 and a pressure regulating reservoir 54 that is similar to the pressure regulating reservoir 44 are provided. In the branched fluid paths Lf2 and Lf2 that communicate with the wheel cylinders WCfl and WCrr, booster valves 52 and 53 that are similar to the booster valves 42 and 43 are provided, and in the fluid path Lf3, reducer valves 55 and 56 that are similar to the reducer valves 45 and 46 are provided. In the fluid path Lf4, a pump 57, a safety valve 57a, and a damper 58, which are similar to the pump 47, the safety valve 47a, and the damper 48, respectively, are provided. On the other hand, in the booster valves 52 and 53, safety valves 52a and 53a, which are similar to the safety valves 42a and 43a are provided in parallel.

As described above, the brake fluid pressure control device 25 may directly apply the basic fluid pressure from the master cylinder 23 to the wheel cylinders WCfl, WCfr, WCrl, and WCrr. Further, the brake fluid pressure control device 25 may apply the control fluid pressure formed by the driving of the pumps 47 and 57 and the control of the fluid pressure control valves 41 and 51 to the wheel cylinders WCfl, WCfr, WCrl, and WCrr of the wheels Wfl, Wfr, Wrl, and Wrr. That is, the brake fluid pressure control device 25 may apply the brake fluid pressure B according to the driver's operation state (depression state) of the brake pedal 21 to the wheel cylinders WCfl, WCfr, WCrl, and WCrr, or may control the fluid pressure of the wheel cylinders WCfl, WCfr, WCrl, and WCrr regardless of the driver's operation state (depression state) of the brake pedal 21. In an embodiment of the present invention, the motion control device for a vehicle according to an embodiment of the present invention performs its operation using the brake fluid pressure control device 25 and the brake control ECU 26, and the brake fluid pressure control device 25 independently applies the braking force to the left and right front and rear wheels Wfl, Wfr, Wrl, and Wrr of the vehicle M.

The brake control ECU 26, as shown in FIG. 1, is connected to wheel speed sensors Sfl, Sfr, Srl, and Srr connecting the wheel speed of the left and right front and rear wheels Wfl, Wfr, Wrl, and Wrr, an acceleration sensor 28 detecting acceleration in the front and rear directions of the vehicle (longitudinal acceleration), an accelerator opening degree sensor 15a (constituting the longitudinal acceleration index obtaining unit) detecting an operation amount A (corresponding to the longitudinal acceleration indexes according to the present invention) of the accelerator pedal 15 that is operated by the driver and outputting a signal that indicates the operation amount A of the accelerator pedal 15, a brake switch 21$a$ outputting an operation signal of the brake pedal 21, a pressure sensor P (constituting the longitudinal acceleration index obtaining unit according to the present invention) detecting the master cylinder pressure in the master cylinder 23, and a lateral acceleration sensor 34 constituting the rollover prevention control start unit detecting the lateral acceleration applied to the vehicle. This lateral acceleration sensor 34 detects and outputs a signal that indicates the incidence trend of the excessive roll angle that is the component in the left and right directions of the actual acceleration that acts on the vehicle, that is, a signal that indicates the actual lateral acceleration as the index value of the rollover trend of the vehicle body.

The wheel speed sensors Sfl, Sfr, Srl, and Srr are provided in the vicinity of the wheels Wfl, Wfr, Wrl, and Wrr, and output pulse signals having frequencies according to the rotating speed (wheel speed) of the wheels Wfl, Wfr, Wrl, and Wrr to the brake control ECU 26. The yaw rate sensor 27 detects and outputs the yaw rate of the vehicle M to the brake control ECU 26. The acceleration sensor 28 detects the acceleration in the front and rear directions or in the left and right directions of the vehicle M, and outputs the detection signal to the brake control ECU 26. The steering sensor 61$a$ detects the rotating angle from the neutral position of the steering 61, and outputs the signal that indicates the actual steering angle θ (corresponding value of the actual steering angle) to the brake control ECU 26.

The brake control ECU 26 has a microcomputer (not illustrated), and the microcomputer is provided with an input/output interface, a RAM, a CPU, and a ROM (all not illustrated) connected through a bus. The CPU executes a control program for suppressing rollover that corresponds to the flowchart 1 of FIG. 5, and performs the vehicle motion control according to an embodiment of the present invention. The RAM temporarily stores variable that are required to execute the program, and the ROM stores the control program and the like.

As shown in FIGS. 1 and 2, the control program for suppressing the rollover, which the brake control ECU 26 has, is provided with a rollover prevention control start unit obtaining the indexes that start the rollover prevention control and starting the control, a longitudinal acceleration index obtaining unit according to the present invention, a limit time setting unit, an increase amount setting unit, and a braking control unit for controlling the limit time Tr.

The rollover prevention control start unit sets a predetermined threshold value with respect to the lateral acceleration value obtained by the lateral acceleration sensor 34, and commands the start of the rollover prevention control at a time when the lateral acceleration of the turning vehicle exceeds the threshold value. At this time, the predetermined threshold value is determined by pre-evaluation or the like, and is stored in the ROM of the brake control ECU 26.

If the rollover prevention control starts, the longitudinal acceleration index obtaining unit obtains the accelerator operation amount A which is the acceleration index that is correlated to the acceleration on the forward side of the vehicle of the longitudinal acceleration indexes. At this time, the accelerator operation amount A is obtained by the accelerator opening degree sensor 15$a$, and if the accelerator operation amount A is large, the acceleration becomes high, while if the accelerator operation amount A is small, the acceleration becomes low.

Further, the longitudinal acceleration index obtaining unit obtain the brake fluid pressure B for controlling the deceleration of the vehicle M as the acceleration index on the deceleration side (setback side) of the longitudinal acceleration indexes. The brake fluid pressure B is detected by the pressure sensor P of the brake fluid pressure control device 25, and is directly applied to the wheel cylinders WCfl, WCfr, WCrl, and WCrr through stepping on the brake pedal 21. At this time, if the brake fluid pressure B is high, the acceleration on the deceleration side becomes high, while if the brake fluid pressure B is low, the acceleration on the deceleration side becomes low.

Figure 3:
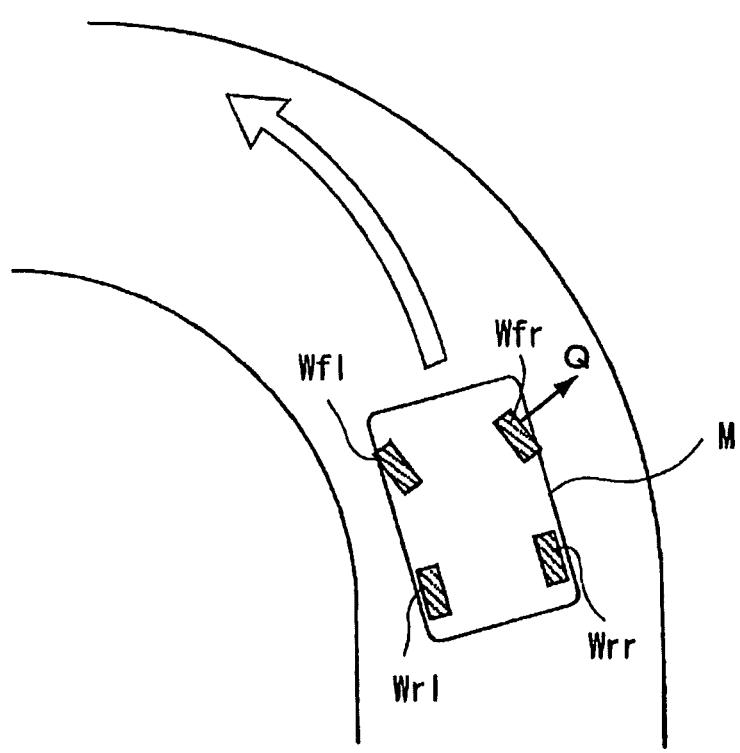
FIG. 3 is a view illustrating the state of wheels when a vehicle M is turning left according to an embodiment of the present invention.

The limit time setting unit sets the accelerator operation amount A that is the longitudinal acceleration index obtained by the longitudinal acceleration index obtaining unit and the limit time Tr that is the time from the start of the application of the braking force to the rear wheel located on the radially outer of the turning locus on the basis of the brake fluid pressure B to the application of the braking force to the front wheel located on the radially outer of the turning locus. In the present invention, the limit time Tr unit the predetermined time when the braking force P is applied to the rear wheel located on the radially outer of the turning locus and the braking force is applied to the front wheel located on the radially outer of the turning locus after the elapse of the predetermined time. That is, as illustrated in FIG. 3, if the accelerator pedal is operated and the vehicle M is accelerated on the forward side, for example, as the vehicle is turning to the left, generally the load of the vehicle is transferred to the side of the both rear wheels Wrl and Wrr, and the load on the side of both front wheels Wfl and Wfr is decreased in comparison to the side of both rear wheels Wrl and Wrr. At this time, if the braking force P is applied to the front wheel located on the radially outer of the turning locus Wfr, the front wheel located on the radially outer of the turning locus Wfr (right front wheel) to which the load is not applied generates a braking slip and makes a bulge in the direction of the centrifugal force (direction Q in the drawing) during the turning to deteriorate the trace performance.

In this case, according to the present invention, as shown in graphs of FIGS. 4(*a*) to 4(*d*), the braking force P according to the predetermined increase amount ΔFa is first applied to the rear wheel located on the radially outer of the turning locus Wrr (right rear wheel) to which the large load is applied. Through this, the load of the vehicle is transferred to the forward, and the load of the front wheel located on the radially outer of the turning locus Wfr is increased. In the middle of the transfer of the load to the front wheel located on the radially outer of the turning locus Wfr, the braking force P may be applied to the front wheel located on the radially outer of the turning locus Wfr for a predetermined increasing amount ΔF1 (see FIG. 4(*a*)), and may not be completely applied (the increasing amount ΔF1=0) (see FIG. 4(*b*)). Further, the predetermined increasing amount ΔF1 may not be constant as shown in FIG. 4(*c*), or may be increased in a step pattern as shown in FIG. 4(*d*).

Further, after the limit time Tr in which a sufficient load is applied to the front wheel located on the radially outer of the turning locus Wfr, the braking force P of approximately the same magnitude as the braking force P (the braking force according to the predetermined increasing amount ΔFa) that is applied to the rear wheel located on the radially outer of the turning locus Wrr is applied to the front wheel located on the radially outer of the turning locus Wfr.

Further, when the brake pedal 21 is operated while the vehicle M is turning to the left to reduce the vehicle speed, it is general that the load of the vehicle M is transferred to the side of both front wheels Wfl and Wfr and the load on the side of both rear wheels Wrl and Wrr is decreased. Even in this case, the limit time Tr is provided according to the magnitude of the load that is applied to the front wheel located on the radially outer of the turning locus Wfr. For example, if the load is sufficiently applied to the front wheel located on the radially outer of the turning locus Wfr through increasing the depression of the brake pedal 21, it is not necessary to provide the limit time Tr during the start of the rollover prevention control, and the braking force P according to the increasing amount ΔFa may be simultaneously applied to the turning outer front and rear wheels WIT and the front wheel located on the radially outer of the turning locus Wfr. Further, if the load is not sufficiently applied to the front wheel located on the radially outer of the turning locus Wfr, the limit time Tr is set according to the application degree of the load.

As described above, the front and rear wheel ratio of the vehicle load differs according to the magnitude of the longitudinal acceleration index. According to the present invention, the magnitude of the longitudinal acceleration is estimated by the operation amount A of the accelerator pedal 15 that is the longitudinal acceleration index and the brake fluid pressure B that is generated by stepping on the brake pedal 21. Further, if it is determined that the load of the front wheel located on the radially outer of the turning locus Wfr is greatly decreased in the load ratio of the front and rear wheels of the vehicle by the estimated longitudinal acceleration, the return of the load for the front wheel located on the radially outer of the turning locus Wfr is waited for through lengthening of the limit time Tr. Further, if it is determined that the load of the front wheel located on the radially outer of the turning locus is not greatly decreased, the limit time Tr is shortened to correspond to such determination. On the other hand, according to an embodiment of the present invention, the detailed numerical setting of the limit time Tr is performed on the basis of the driver's feeling by prior experiments.

The increase amount setting unit sets the increasing amount ΔF1 per unit time of the braking force P that is applied to the front wheel located on the radially outer of the turning locus Wfr during the duration of the above-described limit time Tr. The increase amount setting unit sets the increasing amount on the basis of the accelerator operation amount A that is the longitudinal acceleration index that is obtained by the longitudinal acceleration index obtaining unit or the brake fluid pressure B. The method of setting the increasing amount is the same as the method of setting the limit time Tr that is set by the limit time setting unit. For example, if the acceleration on the forward side is high, the load applied to the front wheel located on the radially outer of the turning locus becomes small, and thus the increasing amount ΔF1 per unit time of the braking force P to the front wheel located on the radially outer of the turning locus Wfr is set to be small to facilitate the return of the load to the front wheel located on the radially outer of the turning locus Wfr. Further, if the acceleration on the forward side is low, the load of the vehicle that is applied to the front wheel located on the radially outer of the turning locus Wfr becomes larger than that in the case where the acceleration is high, and the increasing amount ΔF1 per unit time of the braking force P to the front wheel located on the radially outer of the turning locus Wfr approaches the increasing amount ΔFa per unit time of the braking force P to the rear wheel located on the radially outer of the turning locus Wrr. Through this, since the front wheel located on the radially outer of the turning locus Wfr does not lose the gripping force on the road surface and an excessive lateral slip is suppressed, a good trace is ensured, and the rollover suppression is performed by sufficient speed reduction. On the other hand, the increasing amount ΔFa that is applied to the rear wheel located on the radially outer of the turning locus Wrr is preset through the prior study, and is stored in the ROM.

For example, if the brake fluid pressure B is high and the acceleration on the reduction side is high, the vehicle is typically falling forward, and the load of the vehicle is greatly transferred to the forward portion of the vehicle. Accordingly, the increasing amount ΔF1 per unit time of the braking force P for the front wheel located on the radially outer of the turning locus Wfr during the limit time Tr may become almost equal to the increasing amount ΔFa per unit time of the braking force P for the rear wheel located on the radially outer of the turning locus Wrr.

Further, if the brake fluid pressure B is low, that is, if the acceleration on the reduction side is low, the load of the vehicle is transferred forward a little bit, and thus the increasing amount ΔF1 per unit time of the braking force P for the front wheel located on the radially outer of the turning locus Wfr during the limit time Tr is set to be smaller than the increasing amount ΔFa per unit time of the braking force P for the rear wheel located on the radially outer of the turning locus Wrr. Accordingly, the load is returned to the front wheel located on the radially outer of the turning locus Wfr, and the braking force P can be applied to the front wheel located on the radially outer of the turning locus Wfr in a state where the load is certainly applied to the front wheel located on the radially outer of the turning locus Wfr. Accordingly, since the front wheel located on the radially outer of the turning locus Wfr does not lose the gripping force on the road surface, an excessive lateral slip is suppressed, a good tracing performance is ensured, and the rollover suppression is performed by sufficient speed reduction.

Hereinafter, the operation of the motion control device for a vehicle as configured above will be described in detail on the basis of the drawings. In an embodiment of the present invention, as shown in FIG. 3, it is assumed that the vehicle M turns to the left, the front wheel located on the radially outer of the turning locus becomes the right front wheel Wfr, and the rear wheel located on the radially outer of the turning locus becomes the right rear wheel Wrr. If an ignition switch (not illustrated) of the vehicle M is turned on, the brake control ECU 26 executes a program that corresponds to the flowchart 1 of FIG. 5.

If flowchart 1 of FIG. 5 starts in step S10, the flag is first set to 0 in step S11. Then, it is confirmed whether or not the flag is 0 in step S12. This time, since the flag is set to flag=0 in step S11, the processing corresponds to "YES" in step S12, and then proceeds to step S13.

In step S13 that corresponds to the rollover prevention control start unit, the brake control ECU 26 obtain a lateral acceleration value that is used as an index to start the rollover prevention control through the lateral acceleration sensor 34 and monitors the obtained values in a predetermined period. If the vehicle starts turning to the left as shown in FIG. 3 and the lateral acceleration value exceeds a predetermined threshold value, the processing proceeds to step S14, while if the lateral acceleration value does not exceed the predetermined threshold value, the processing is finished in step S24.

In step S14 (the longitudinal acceleration index obtaining unit according to the present invention), the brake control ECU 26 obtain the accelerator operation amount A that is an acceleration index on the forward side of the longitudinal acceleration indexes that are detected by the accelerator opening degree sensor 15a.

Then, in step S15 that corresponds to the acceleration index obtaining unit, the brake control ECU 26 obtain the brake fluid pressure B that is the acceleration index on the deceleration side (setback side) of the longitudinal acceleration indexes that are obtained by the pressure sensor P.

In step S16 (the limit time setting unit and the braking control unit according to the present invention), the limit time Tr is calculated and set according to the accelerator operation amount A that is the obtained longitudinal acceleration index and the brake liquid pressure B as described above.

Then, in step S17 (the increase amount setting unit and the braking control unit according to the present invention), the increasing amount $\Delta F1$ per unit time for the front wheel located on the radially outer of the turning locus Wfr of the limit time Tr on the basis of the operation amount A of the accelerator pedal 15 and the brake liquid pressure B is set as described above.

In step S18, the braking force P according to the predetermined increasing amount $\Delta Fa$ that is previously set is applied to the rear wheel located on the radially outer of the turning locus Wrr. Through this, since the rear wheel located on the radially outer of the turning locus Wrr does not greatly lose the gripping force on the road surface, the centrifugal force of the vehicle M is reduced through an appropriate speed reduction of the vehicle M, and thus the roll force of the vehicle. Further, through application of the braking force P to the rear wheel located on the radially outer of the turning locus Wrr, the vehicle M is falling forward, and the load is transferred to the front wheel located on the radially outer of the turning locus Wfr.

In this case, the pump 57 is driven by the electric motor 33, and the fluid pressure according to the braking force P is applied to the wheel cylinder WCrr by making a predetermined amount of brake fluid flow to the master cylinder 23 and the wheel cylinder WCrr. Specifically, the fluid pressure control valves 41 and 51 are excited to be in a differential pressure state. Further, the booster valve 53 and the reducer valve 56 that correspond to the rear wheel located on the radially outer of the turning locus Wrr is non-excited to be in the open/close states, respectively. Through this, the fluid pressure is applied to the wheel cylinder WCrr through the flow of the predetermined amount of brake liquid pressure, and the braking force P is applied only to the rear wheel located on the radially outer of the turning locus Wrr. The change of the magnitude to apply the braking force P is performed by changing the current that is applied to a linear solenoid 51a provided on the fluid pressure control valve 51. The magnitude of the current is determined based on a previously prepared map.

In order to prevent the fluid pressure from being applied to the left front wheel Wfl (turning inner front wheel), the booster valve 52 that corresponds to the wheel is excited to be in a close state, the reducer valve 55 is excited to be in an open state, and the wheel cylinder WCfl communicates with the reservoir 54. In the same manner, in order to prevent the fluid pressure from being applied to the left rear wheel Wrl (turning inner rear wheel) and to the front wheel located on the radially outer of the turning locus Wfr, the booster valves 42 and 43 that correspond to the respective wheels are excited to be in a close state, the reducer valves 45 and 46 are excited to be in an open state, and the wheel cylinders WCfl and WCfr communicate with the reservoir 44.

In step S19 that corresponds to the braking control unit according to the present invention together with step S20, the elapsed time Tp from the start of the application of the braking force to the rear wheel located on the radially outer of the turning locus Wrr is counted.

In step S20 (the braking control unit according to the present invention), the elapsed time Tp and the limit time Tr are compared with each other, and if the elapsed time Tp is shorter than the limit time Tr, that is, if the elapsed time does not reach the limit time Tr, the processing proceeds to step S21. Further, in step S21, the vehicle load is not greatly applied to the front wheel located on the radially outer of the turning locus Wfr, and thus the increasing amount $\Delta F1$ according to the vehicle load is applied. Through this, the braking force P that is the same as that applied to the rear wheel located on the radially outer of the turning locus Wrr is applied to the front wheel located on the radially outer of the turning locus Wfr, and the excessive lateral slip due to a loss of the gripping force does not occur. Further, since a small braking force P (the increasing amount $\Delta F1$) according to the load that is applied to the front wheel located on the radially outer of the turning locus Wfr from the control start is applied to the front wheel located on the radially outer of the turning locus Wfr, the lateral slip is suppressed, and the front wheel located on the radially outer of the turning locus Wfr contributes to the speed reduction of the vehicle together with the rear wheel located on the radially outer of the turning locus Wrr, resulting in that the centrifugal force is reduced and the rollover is suppressed.

In this case, the pump 47 is driven by the electric motor 33, and the fluid pressure according to the braking force P is applied to the wheel cylinder WCfr by making a predetermined amount of brake fluid flow to the master cylinder 23 and the wheel cylinder WCfr. Specifically, the fluid pressure control valves 41 and 51 are excited to be in a differential pressure state, and the booster valve 43 and the reducer valve 46 that correspond to the front wheel located on the radially outer of the turning locus Wfr is non-excited to be in the open/close states, respectively. Through this, the fluid pressure is applied to the wheel cylinder WCfr through the flow of the predetermined amount of brake liquid pressure, and the braking force P according to the increasing amount $\Delta F1$ is applied to the front wheel located on the radially outer of the turning locus Wfr (right front wheel).

In order to prevent the fluid pressure from being continuously applied to the left front wheel Wfl (turning inner front wheel) and the left rear wheel Wrl (turning inner rear wheel), the booster valves 52 and 42 that correspond to the wheels are excited to be in a close state, the reducer valves 55 and 45 is excited to be in an open state, and the wheel cylinders WCfl and WCrl communicate with the reservoir 54.

Then, the flag is set to 1 in step S22, and the processing proceeds to step S12. In step S12, since the flag is set to 1 this time, the processing corresponds to "NO", and then proceeds to step S19. Further, in step S20, the elapsed time Tp and the limit time Tr are compared with each other, and the steps S19 to S21 are repeatedly performed until the elapsed time Tp becomes the limit time Tr (see FIG. 4(a)).

Figure 4A:
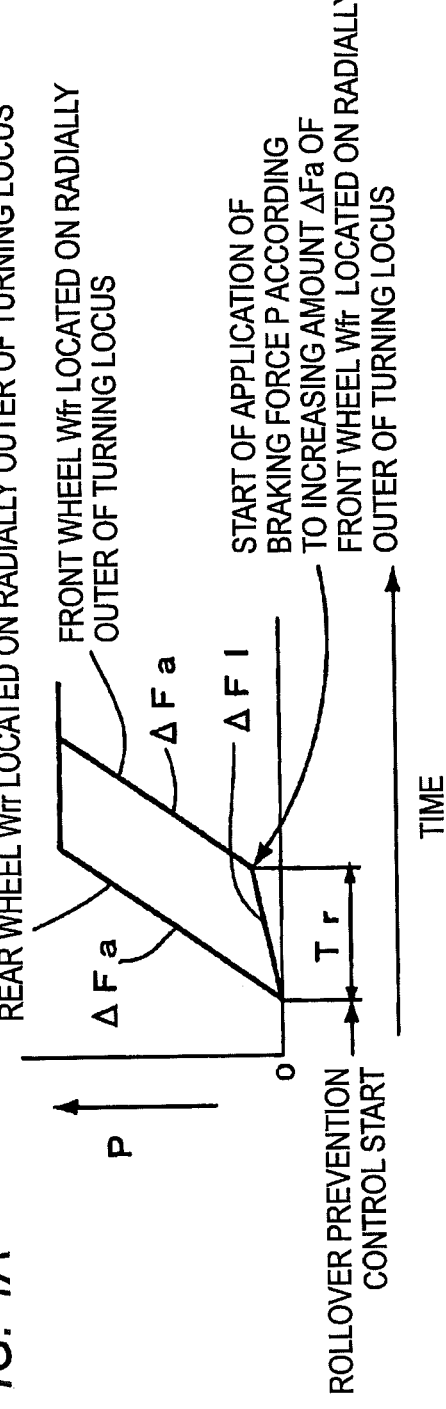
FIGS. 4A to 4D are time-braking force characteristic graphs showing application of a braking force to a front wheel located on the radially outer of the turning locus in different conditions.
Figure 4B:
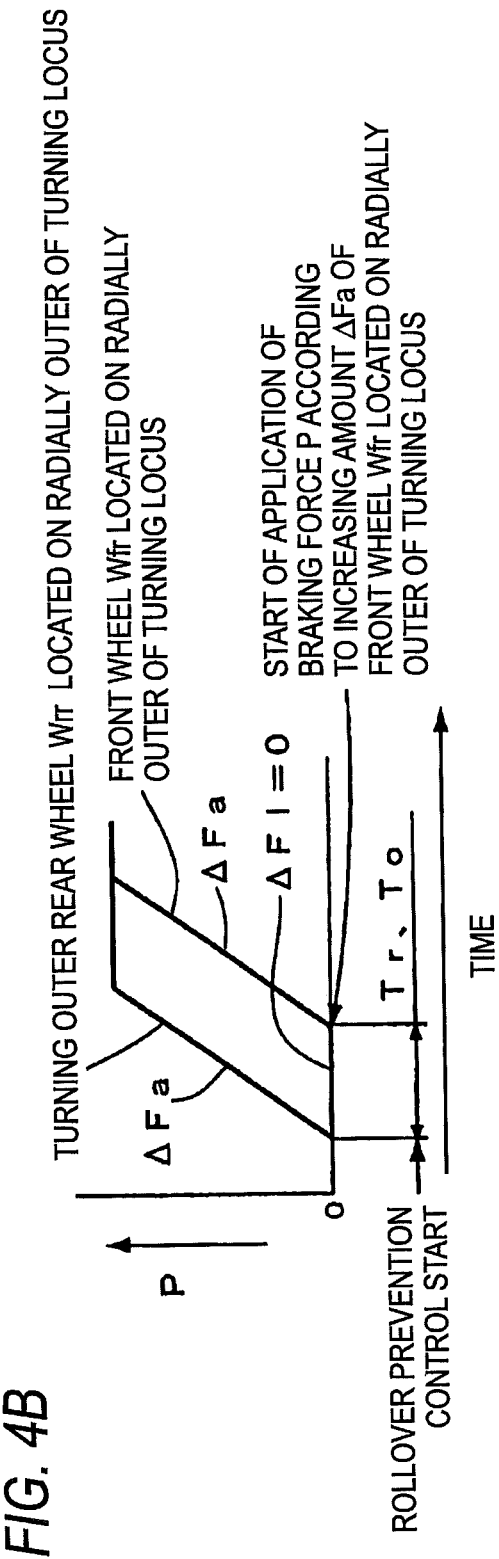
Figure 4C:
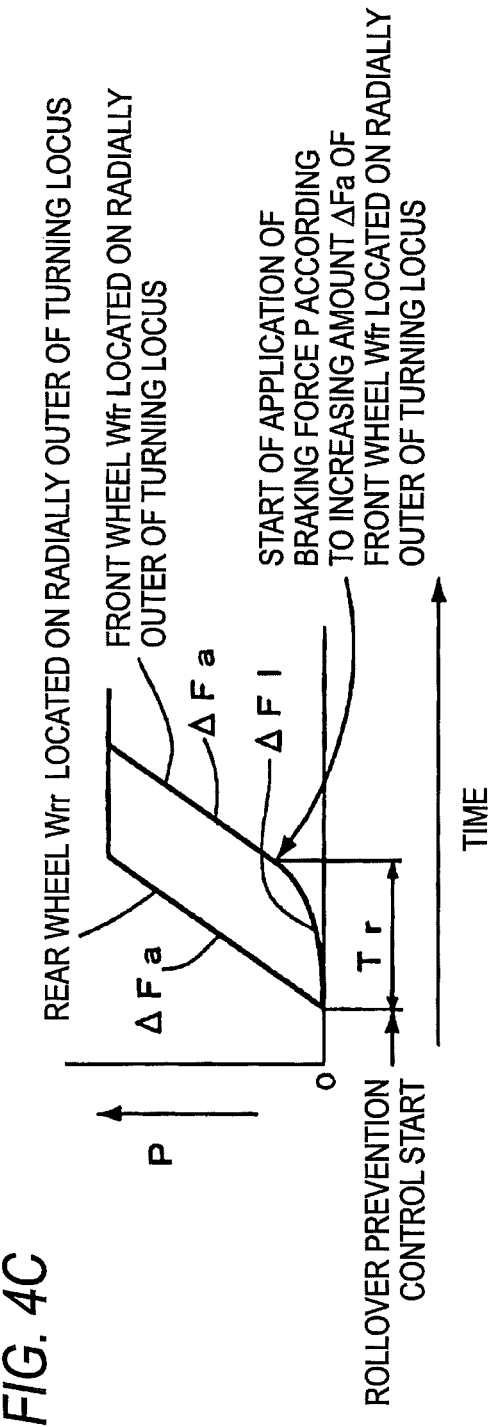
Figure 4D:
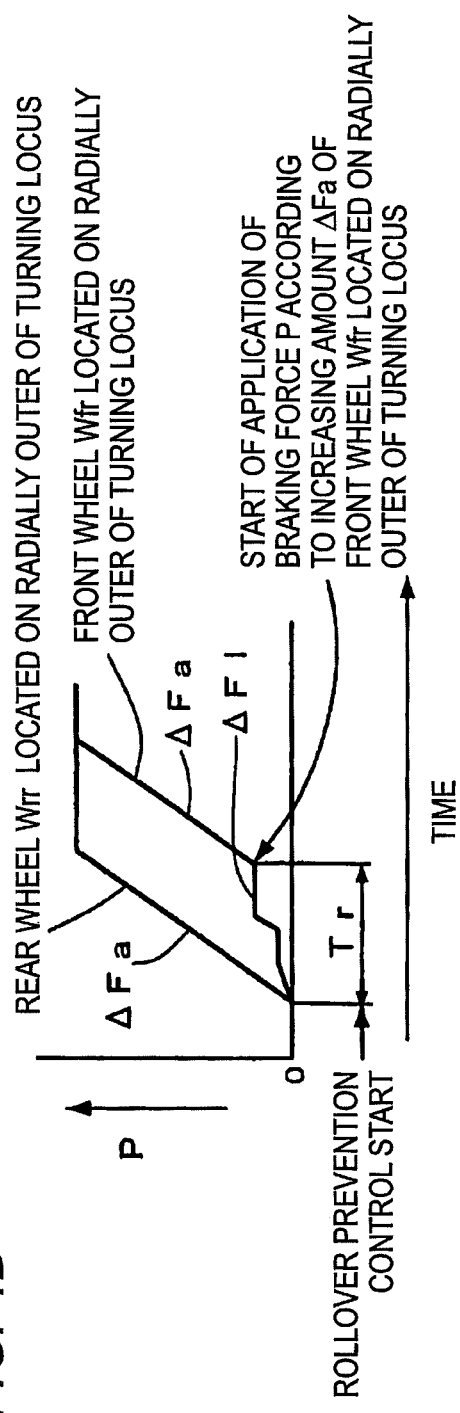

After the repeated process, if the elapsed time Tp reaches the limit time Tr in step S20, the processing proceeds to step S23, the braking force P according to the predetermined increasing amount $\Delta Fa$ is applied to the front wheel located on the radially outer of the turning locus Wfr (see FIG. 4(a)), and the program is finished. Through this, even if a large braking force P according to the increasing amount $\Delta Fa$ is applied to the front wheel located on the radially outer of the turning locus Wfr in a state where the vehicle load is sufficiently applied, the front wheel located on the radially outer of the turning locus Wfr does not skid excessively, and the speed of the vehicle M is further reduced to suppress the rollover. Further, by the appropriate gripping force on the road surface, a good trace is obtained.

On the other hand, in the first embodiment of the present invention, a flag determination unit is provided in step S12, and the processing of steps S13 to S18 is omitted until the elapsed time Tp reaches the limit time Tr in step S20. However, the present invention is not limited thereto, and steps S11, S12, and S22 may be deleted and the steps S13 to S18 may be appropriately processed until the elapsed time Tp reaches the limit time Tr in step S20. Through this, more accurate control, which can appropriately cope with the situation, can be performed.

As is clear from the above description, according to the first embodiment, during the turning of the vehicle M, application of the braking force P to the turning outer wheel Wfr is limited until the predetermined limit time Tr elapses from the start of the braking force P applied to the rear wheel located on the radially outer of the turning locus Wm That is, of the front wheel located on the radially outer of the turning locus Wfr of both front wheels that move on the outer arc in the turning radius and the rear wheel located on the radially outer of the turning locus Wrr of both rear wheels, during the turning of the vehicle M, the braking force P is first applied to the rear wheel located on the radially outer of the turning locus Wrr that does not directly deteriorate a yaw moment of the vehicle M rather than the front wheel located on the radially outer of the turning locus Wfr. Accordingly, since the vehicle M has a reduced speed without greatly changing the traveling line and the centrifugal force that acts on the vehicle is reduced, the rollover of the vehicle M can be suppressed without worsening the trace due the excessive lateral slip. Further, by the application of the braking force P to the rear wheel located on the radially outer of the turning locus Wrr, the vehicle M is falling forward, and the load is transferred to the front wheel located on the radially outer of the turning locus Wfr that is liable to vehicle load missing. Accordingly, after the vehicle load is sufficiently applied to the front wheel located on the radially outer of the turning locus Wfr after the predetermined limit time Tr elapses from the start of the braking force P applied to the rear wheel located on the radially outer of the turning locus WIT, the braking force P is applied to the front wheel located on the radially outer of the turning locus Wfr. In the case of applying the braking force P to the front wheel located on the radially outer of the turning locus Wfr, since the movement of the load to the front wheel located on the radially outer of the turning locus Wfr is performed and the frictional circle of the front wheel located on the radially outer of the turning locus Wfr becomes larger, the decrease of the lateral force due to the application of the braking force P can be suppressed. Through this, the centrifugal force can be sufficiently reduced by large braking of the front and rear wheels without greatly changing the traveling line of the vehicle M, and thus the rollover of the vehicle can be suppressed with a good tracing performance maintained. Further, since the timing of application of the braking force P to the front wheel located on the radially outer of the turning locus Wfr is managed by the limit time Tr, the control is simplified.

On the other hand, the friction circle is an index that is typically used when explaining a tire grip. In a circular graph, Y axis represents the force that is applied to a tire in the front and rear directions (acceleration is in a plus direction, and braking force is in a minus direction), and X axis represents a lateral force that is applied to the tire (cornering in the plus direction, for example, to the right, and cornering in the minus direction, for example, to the left). When the tire is traveling in the circular graph, slip does not occur between the tire and the road surface, and thus, as the friction circle is larger, the range of non-slip state becomes wider.

Further, according to the first embodiment, the braking control unit controls the increasing amount $\Delta F1$ per unit time of the braking force P that is applied to the front wheel located on the radially outer of the turning locus Wfr to be smaller than the increasing amount $\Delta Fa$ per unit time of the braking force P that is applied to the rear wheel located on the radially outer of the turning locus Wrr. Since the braking force P is applied to the turning outer front and rear wheels Wfr and Wrr depending on the magnitude of a vehicle load that is received by the rear wheel located on the radially outer of the turning locus Wrr having a large vehicle load and the front wheel located on the radially outer of the turning locus Wfr having a small vehicle load during the turning acceleration, the occurrence of an excessive lateral slip, which is caused by a loss of the gripping force of the front wheel located on the radially outer of the turning locus Wfr, is prevented, and thus the tracing performance of the vehicle is not deteriorated.

Further, according to the first embodiment, the longitudinal acceleration index obtaining unit obtain the accelerator operation mount A and the brake liquid pressure B that are the longitudinal acceleration indexes of the vehicle M, and the increase amount setting unit sets the increasing amount $\Delta F1$ per unit time of the braking force P that is applied to the front wheel located on the radially outer of the turning locus Wfr on the basis of the obtained longitudinal acceleration indexes. As described above, the longitudinal acceleration indexes of the vehicle are obtained in real time, the load balance between the rear wheel located on the radially outer of the turning locus Wrr and the front wheel located on the radially outer of the turning locus Wfr of the vehicle M is estimated on the basis of the obtained longitudinal acceleration indexes, and the increasing amount $\Delta F1$ per unit time of the braking force P for the front wheel located on the radially outer of the turning locus Wfr is set according to the load balance. Through this, an appropriate braking force P can be applied to the front wheel located on the radially outer of the turning locus Wfr according to the traveling state of the vehicle M.

Further according to the first embodiment, the longitudinal acceleration index obtaining unit obtain the longitudinal acceleration indexes of the vehicle M on the basis of the obtained longitudinal acceleration indexes (the accelerator operation amount A and the brake fluid pressure B). As described above, the longitudinal acceleration indexes of the vehicle M are obtained in real time, the load balance between the rear wheel located on the radially outer of the turning locus Wrr and the front wheel located on the radially outer of the turning locus Wfr of the vehicle M is estimated on the basis of the obtained longitudinal acceleration indexes, and the limit time Tr of the braking force P for the front wheel located on the radially outer of the turning locus Wfr is set according to the load balance. Through this, the braking force P according to the increasing amount $\Delta F1$ is applied during the appropriate limit time Tr according to the traveling state of the vehicle M, and after the appropriate limit time Tr, the braking force P according to the increasing amount $\Delta Fa$ is applied to the front wheel located on the radially outer of the turning locus Wfr.

Figure 6:
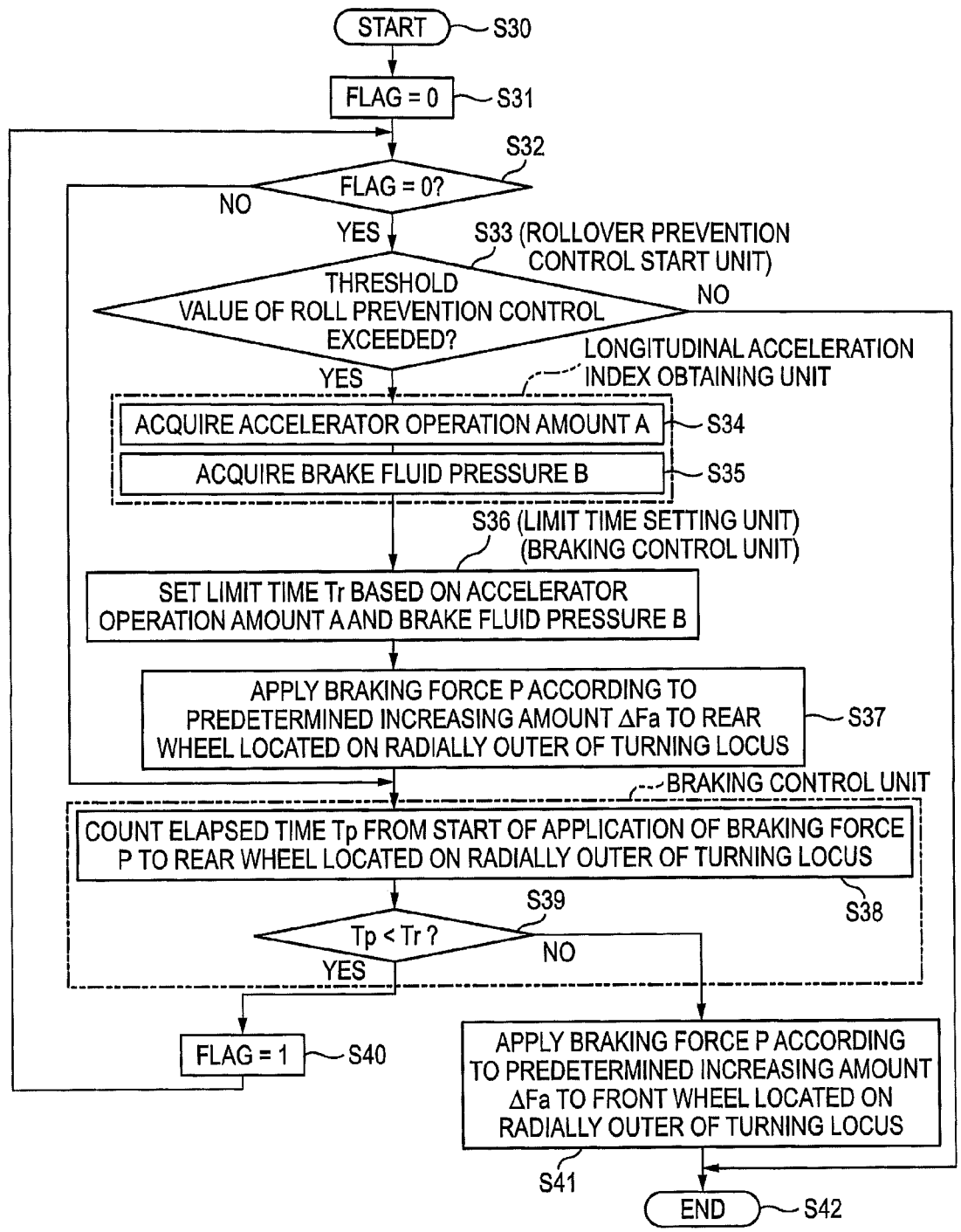
FIG. 6 is a motion control flowchart 2 according to a second embodiment of the present invention.

Then, a second embodiment will be described. As shown in the flowchart 2 (steps S30 to S42) of FIG. 6, according to the second embodiment, the step S17 (the increase amount setting unit and the braking control unit) and the step S21 of applying the braking force P to the front wheel located on the radially outer of the turning locus Wfr according to the set increasing amount $\Delta F1$, which are included in the flowchart 1 according to the first embodiment, are deleted. Although the detailed description will be omitted, according to the second embodiment, application of the braking force P, which is set to 0, according to the increasing amount $\Delta F1$ to the front wheel located on the radially outer of the turning locus Wfr is not performed (see FIG. 4(*b*)) during the continuous limit time Tr in comparison to the first embodiment.

As is clear from the above description, according to the second embodiment, the braking control unit sets the increasing amount per unit time of the braking force P applied to the front wheel located on the radially outer of the turning locus Wfr to zero. Accordingly, before the load transfer to the front wheel located on the radially outer of the turning locus Wfr is sufficiently carried out, the braking force P (the increasing amount ΔFa) is not applied to the front wheel located on the radially outer of the turning locus, but is applied only to the rear wheel located on the radially outer of the turning locus Wrr, and thus the load transfer to the front wheel located on the radially outer of the turning locus Wfr is carried out more reliably. Further, the braking force P (the increasing amount ΔFa) is applied to the front wheel located on the radially outer of the turning locus Wfr after the load transfer to the front wheel located on the radially outer of the turning locus Wfr is sufficiently carried out. Through this, the excessive lateral slip is suppressed by sufficient grip for the road surface, and thus the front wheel located on the radially outer of the turning locus Wfr gets a good trace. At the same time, the rollover of the vehicle M is suppressed by reducing the centrifugal force of the vehicle M through sufficient reduction of the vehicle speed along with the rear wheel located on the radially outer of the turning locus Wrr.

On the other hand, as described above, even in a state where the increasing amount per unit time of the braking force P applied to the front wheel located on the radially outer of the turning locus Wfr is not set to zero, the increasing amount ΔF1 per unit time of the braking force P applied to the front wheel located on the radially outer of the turning locus Wfr may be set to be smaller than the increasing amount ΔFa per unit time of the braking force P applied to the rear wheel located on the radially outer of the turning locus Wrr according to the pitch inertia that indicates the front and rear load of the vehicle M. Through this, the centrifugal force of the vehicle is further decreased without deteriorating a good trace, and thus the rollover of the vehicle can be preferably suppressed.

Figure 7:
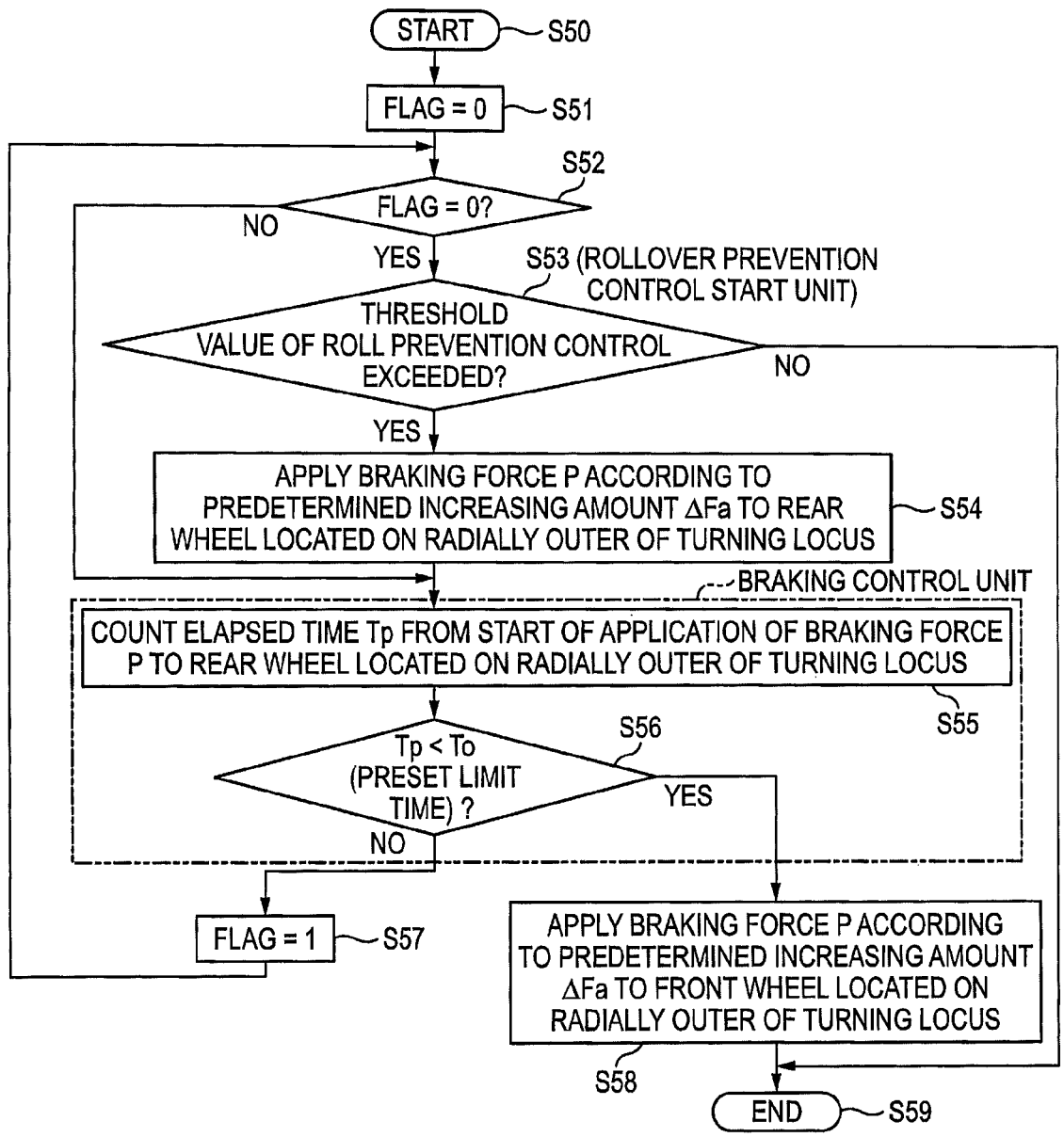
FIG. 7 is a motion control flowchart 3 according to a third embodiment of the present invention.

Then, a third embodiment will be described. As shown in the flowchart 3 (steps S50 to S59) of FIG. 7, according to the third embodiment, the steps S34 and S35 (longitudinal acceleration setting unit) and the step S36 (the limit time setting unit and the braking control unit), which are included in the flowchart 2 according to the second embodiment, are deleted, and the step S39 is changed to step S56. Accordingly, only the changed point will be described, but other detailed description thereof will be omitted.

In the third embodiment, the limit time To is not set by the limit time setting unit, but is preset and stored in a ROM. Then, the limit time To is compared with the elapsed time Tp in step S56, and if the elapsed time Tp reaches the preset limit time To, the processing proceeds to step S58, the braking force according to a predetermined increasing amount ΔFa is applied to the front wheel located on the radially outer of the turning locus Wfr (see FIG. 4(b)), and the program is finished. Through this, although the limit time To is a fixed value, the effect that corresponds to the effect according to the second embodiment can be obtained. Further, since the control is simplified, the third embodiment can correspond to a low-cost.

According to the embodiments of the present invention, the lateral acceleration that is detected by the lateral acceleration sensor 34 is adopted as the index that starts the rollover prevention control. However, the present invention is not limited thereto, but, for example, indexes, such as a yaw rate that acts on the vehicle, the roll angle generated in the vehicle, a roll angular velocity that is a temporal variation of the roll angle, and a height of a specified region (wheel portion) of the vehicle body from the road surface in the vicinity of wheels Wfl, Wfr, Wrl, and Wrr, may be used.

According to the embodiments of the present invention, the detailed numerical setting of the limit time Tr was obtained by experiments on the basis of the driver's feeling. However, the detailed numerical setting is not limited to the driver's feeling, but the detailed numerical value of the limit time Tr may be set on the basis of an actual slip rate of the front wheel located on the radially outer of the turning locus Wfr that is obtained by computation so that the slip rate is within the range of a target value. Further, the detailed numerical value may be set on the basis of the required trace performance (traceability) of the wheel so that the trace performance is within the range of the target value. Further, when the steering angle θ is large, the limit time Tr may be set to be large on the basis of the steering angle θ of the steering wheel 61.

Further, according to the embodiments of the present invention, the accelerator operation amount A and the brake fluid pressure B are determined as the longitudinal acceleration indexes. However, the longitudinal acceleration indexes are not limited thereto, and an acceleration that is obtained from an engine torque or a wheel speed may be set as the index. Further, instead of the brake fluid pressure B, the depression amount (operation amount) of the brake pedal 15 may be obtained, and the depression amount may be set as the longitudinal acceleration indexes on the speed reducer side. By these indexes, the same effect can be obtained.

Further, a load gauge that can actually measure the load that is applied to the front wheel located on the radially outer of the turning locus Wfr and the rear wheel located on the radially outer of the turning locus Wrr may be arranged in a specified position of the vehicle M, and the load distribution of the front wheel located on the radially outer of the turning locus Wfr and the rear wheel located on the radially outer of the turning locus Wrr of the vehicle, which is actually measured, may be set as the longitudinal acceleration indexes.

EXPLANATION OF SIGN

10: driving system, 15: accelerator pedal, 15a: longitudinal acceleration index obtaining unit (accelerator opening degree sensor), 16: engine control ECU, 25: hydraulic brake control device, 26: rollover prevention control start unit, longitudinal acceleration index obtaining unit, limit time setting unit, increase amount setting unit and braking control unit (brake control ECU), 34: rollover prevention control start unit (lateral acceleration sensor), 40: control system, P: longitudinal acceleration index obtaining unit (pressure sensor), Wfr: front wheel located on the radially outer of the turning locus (right front wheel), Wrr: rear wheel located on the radially outer of the turning locus (right outer wheel), Wfl: left front wheel, Wrl: right rear wheel

The invention claimed is:

1. A motion control device for a vehicle that performs rollover prevention control for suppressing a rollover of the vehicle through application of a braking force to a front wheel located on the radially outer of the turning locus and a rear wheel located on the radially outer of the turning locus of the vehicle, comprising:

a counting unit configured to count elapsed time from the start of the application of the braking force to the rear wheel located on the radially outer of the turning locus of the vehicle as the rollover prevention control;

a braking control unit configured to restrict the application of the braking force to the front wheel located on the radially outer of the turning locus until the elapsed time counted by the counting unit reaches a predetermined limit time when the braking force is applied to the front wheel located on the radially outer of the turning locus and the rear wheel located on the radially outer of the turning locus as the rollover prevention control.

2. The motion control device according to claim 1, wherein the braking control unit makes an increasing amount per unit time of the braking force that is applied to the front wheel located on the radially outer of the turning locus be smaller than an increasing amount per unit time of the braking force that is applied to the rear wheel located on the radially outer of the turning locus as the restriction of the braking force applied to the front wheel located on the radially outer of the turning locus.

3. The motion control device according to claim 2, wherein the braking control unit sets the increasing amount per unit time of the braking force applied to the front wheel located on the radially outer of the turning locus to zero as the restriction of the braking force applied to the front wheel located on the radially outer of the turning locus.

4. The motion control device according to claim 2, further comprising:
a longitudinal acceleration index obtaining unit configured to obtain longitudinal acceleration indexes correlated to longitudinal acceleration of the vehicle; and
an increase amount setting unit configured to set the increasing amount per unit time of the braking force that is applied to the front wheel located on the radially outer of the turning locus on the basis of the longitudinal acceleration indexes that are obtained by the longitudinal acceleration index obtaining unit.

5. The motion control device according to claim 1, further comprising:
a longitudinal acceleration index obtaining unit configured to obtain longitudinal acceleration indexes correlated to longitudinal acceleration of the vehicle; and
a limit time setting unit configured to obtain the limit time on the basis of the longitudinal acceleration indexes that are obtained by the longitudinal acceleration index obtaining unit.

* * * * *